US012599541B2

(12) United States Patent
Cook et al.

(10) Patent No.: US 12,599,541 B2
(45) Date of Patent: Apr. 14, 2026

(54) PILL DEVICE APPARATUS, SYSTEM AND METHODS FOR INTRUSION DETECTION

(71) Applicant: ENPRO, INC., Addison, IL (US)

(72) Inventors: Grant Cook, Geneva, IL (US); Thomas Kohlert, St. Charles, IL (US); Scott Nicholson, South Elgine, IL (US)

(73) Assignee: ENPRO, INC, Addison, IL (US)

( * ) Notice: Subject to any disclaimer, the term of this patent is extended or adjusted under 35 U.S.C. 154(b) by 0 days.

(21) Appl. No.: 18/649,682

(22) Filed: Apr. 29, 2024

(65) Prior Publication Data

US 2025/0228745 A1 Jul. 17, 2025

Related U.S. Application Data

(63) Continuation of application No. 17/110,150, filed on Dec. 2, 2020, now abandoned.

(51) Int. Cl.

| | |
|---|---|
| ***B67C 3/26*** | (2006.01) |
| ***A61J 1/03*** | (2023.01) |
| ***A61J 7/00*** | (2006.01) |
| ***A61J 7/04*** | (2006.01) |

(52) U.S. Cl.

CPC ............... *A61J 7/0076* (2013.01); *A61J 1/03* (2013.01); *A61J 7/0418* (2015.05); *A61J 7/0436* (2015.05); *B67C 3/2628* (2013.01); *B67C 2003/2657* (2013.01)

(58) Field of Classification Search

CPC ......... B65B 57/00; B65B 3/18; B67C 3/2628; B67C 3/26; B67C 3/007; B67C 3/262; B67C 2003/2602

See application file for complete search history.

(56) References Cited

U.S. PATENT DOCUMENTS

| | | | |
|---|---|---|---|
| 3,090,408 | A | 5/1963 | Neacker |
| 3,736,966 | A | 6/1973 | Dichiara |
| 3,742,989 | A | 7/1973 | Campbell et al. |
| 4,049,030 | A | 9/1977 | Abramoska, Jr. |
| 4,513,797 | A | 4/1985 | Tompkins |

(Continued)

FOREIGN PATENT DOCUMENTS

| | | | |
|---|---|---|---|
| CN | 202733067 U * | 2/2013 | |
| FR | 2471536 A1 * | 6/1981 | |
| JP | 2003095390 A | 4/2003 | |

OTHER PUBLICATIONS

PCT International Search Report and Written Opinion, PCT/US11/020131, Apr. 6, 2011, filed from corresponding U.S. Appl. No. 12/984,414.

(Continued)

*Primary Examiner* — Andrew M Tecco

(74) *Attorney, Agent, or Firm* — Patzik, Frank & Samotny Ltd

(57) ABSTRACT

The present disclosure is directed to a vent tube apparatus, system and methods incorporating a ball cage with a modified pill device design comprising a traceable material such as a Radio Frequency Identification (RFID) tag for use in conjunction with a filling machine during container filling operations for a quicker and more accurate detection of the location of the pill device to the extent it becomes detached from the ball cage during filling operations, and to increase the safety of the filling operation and reduce costs and time when a malfunction occurs.

19 Claims, 10 Drawing Sheets

(56) References Cited

U.S. PATENT DOCUMENTS

| | | | | |
|---|---|---|---|---|
| 4,530,384 | A | 7/1985 | Boyes | |
| 4,688,608 | A | 8/1987 | Puskarz et al. | |
| 4,911,570 | A | 3/1990 | Rhoades | |
| 5,697,406 | A | 12/1997 | Trunek | |
| 5,878,797 | A | 3/1999 | Manuel | |
| 5,979,497 | A * | 11/1999 | Cullerton | F16K 15/06 137/533.29 |
| 6,109,483 | A | 8/2000 | Wilke | |
| 6,179,016 | B1 | 1/2001 | Neacker et al. | |
| 7,197,932 | B2 | 4/2007 | Sakai et al. | |
| 7,347,231 | B2 | 3/2008 | Schmoll | |
| 8,739,841 | B2 * | 6/2014 | Cook | F16L 9/14 141/94 |
| 9,388,920 | B2 * | 7/2016 | Cook | B67C 3/007 |
| 10,745,154 | B2 | 8/2020 | Cook | |
| 2005/0199314 | A1 * | 9/2005 | Ruble | B67C 3/2608 141/146 |
| 2007/0215239 | A1 | 9/2007 | Dorney | |
| 2011/0162333 | A1 * | 7/2011 | Cook | F16L 9/14 138/104 |
| 2014/0238540 | A1 | 8/2014 | Cook | |
| 2015/0191260 | A1 | 7/2015 | Cook | |
| 2018/0009554 | A1 * | 1/2018 | Cook | B67C 3/007 |
| 2023/0415931 | A1 | 12/2023 | Cook | |

OTHER PUBLICATIONS

European Search Report and European Search Opinion, EP 11 72 8569, Sep. 10, 2013, filed from corresponding PCT International Application PCT/US11/020131.

David Robson; The Smart Solutio, www.imveurope.com, (www.imveurope.com/features/feature.php?feature_id=31), Oct. 30, 2009.

Fortress Phantom Vent Tube Metal Detector, (http://images.vertmarkets.com/crlive/files/downloads/3cc8f73a-cfbe-406d-b2bf-e049bf941362/VentTube-Phantom.pdf), Sep. 2009.

Vince Cottone, The Bottling Technology Page, Sound Brewing Systems, Inc., (http://www.soundbrew.com/bottling/bottling.html), 2000.

PCT International Search Report and Written Opinion; PCT/US20/62929, dated Apr. 4, 2021, corresponding U.S. Appl. No. 17/110,150.

* cited by examiner

PLAN VIEW

PILL DEVICE APPARATUS, SYSTEM AND METHODS FOR INTRUSION DETECTION

PRIORITY STATEMENT

The present application is a continuation of U.S. patent application Ser. No. 17/110,150, filed Dec. 2, 2020, which claims the benefit of U.S. Provisional Patent Application No. 62/943,025, titled Pill Device Apparatus, System And Methods For Intrusion Detection, filed Dec. 3, 2019, and U.S. Provisional Patent Application Ser. No. 62/955,543, titled Pill Device Apparatus, System And Methods For Intrusion Detection, filed Dec. 31, 2019; all of the foregoing incorporated by reference herein.

FIELD OF THE DISCLOSURE

The present disclosure relates to a novel flat bottom or oval pill device, ball cage, traceable vent tube, or removable vent tube tip or cap incorporating one or more detectors or indicators for use in conjunction with a filling machine during filling operations to increase the safety of the filling operation and reduce the associated cost and time when a malfunction occurs.

The present disclosure relates to food or beverage filling machines and/or methods utilizing novel flat bottom or oval pill devices, ball cages, traceable vent tubes, or removable vent tube tips or caps incorporating a magnet, a Radio Frequency Identification (RFID) tag, or incorporates other types of tags or traceable material allowing for a quicker and more accurate detection of an intrusion and the location of the food or beverage in which the novel flat bottom and oval pill device, ball cage, traceable vent tube, or removable vent tube tip or cap, that has become detached from the filling machine during filling operations, is located.

In particular, the present disclosure relates to a particular design and configuration of a novel flat bottom or oval pill device, and the related ball cage design and shape that provides consistent orientation of the pill device and thus a consistent orientation of the RFID tag, or other detector or indicator, located in the pill device design. By changing the current polypropylene ball used in standard operations to the present novel pill device design and from a spherical to an oval or oblong shape, with or without a flat bottom, (or other similar shape), the orientation of the innovative pill device is consistent such that the magnet or RFID tag located in the pill device design is always known.

Once the location of the magnet or RFID tag or other detector or indicator is consistently known, the antenna or other indicator reader, detecting the RFID tag or indicator (and thus detecting the location of the pill device), can accurately and precisely know if the pill device has successfully entered and left the canister being filled, or if the pill device has inadvertently been left behind in a canister or other location.

BACKGROUND OF THE DISCLOSURE

In the food and beverage industry there is a need for efficient and reliable manufacturing processes to quickly and safely manufacture and package the food and beverage product. Most food and beverage plants across the United States run continuously, 24 hours a day and 7 days a week, to meet the ever-increasing demands. With these stringent demands on their machines as well as personnel, most food and beverage plants have implemented some form of process control or automation. By using programmable logic controllers (PLCs) and various other logic controlling devices, elementary applications that used to require manual attention can now be done with machines.

In particular, the demand today for beverage containers filled with product, such as cola and beer, is greater than it has ever been and continues to grow. These containers can be glass bottles, aluminum cans or any type of canister that can store, for example, consumable beverages, automobile product, hair and skin care product, and any other liquid or semi-liquid product that is packaged and distributed in such a container. These container packages can be any size and shape, such as those found in 12-ounce cola or beer cans and bottles, and the various bottles containing hair care product. These containers can be made from many different materials, such as glass, plastic, aluminum, tin among others, and are enclosed, after being filled with product, using a type of cap or top attached by screwing onto the container, crimping, pressing or heat sealing, or in other ways to enclose the product in the container.

In order to meet this demand for liquid and semi-liquid product, high speed, automatic filling machines are incorporated in the filling process. These automatic machines can load, fill, enclose, and box up thousands of these containers each minute in a high-speed operation. These automatic filling machines load the empty containers onto a conveyor and move the bottles into a location on the machines where the containers come in contact with the filling machine and are filled with product. Once filled, the containers are enclosed or sealed and are quickly moved away from the filling station, and boxed up or packaged along with other filled containers to be shipped or distributed to retail centers and the like.

In such a high-speed operation, when an accident or mistake occurs, hundreds or thousands of containers may inadvertently be filled before the filling machine or process can be halted. In these situations, the hundreds or thousands of containers filled after the accident may need to be discarded, wasting time and money to determine which bottles were filled after the accident.

The fill process will vary depending on the product being filled, and various factors, such as the temperature and viscosity of the product, the beverage gas, the effect of those gases and related pressure characteristics during the filling process. Accordingly, the filling process and related conditions can be optimized and maximized monitoring and controlling these factors. For purposes of this application and for simplicity, most of the examples herein will refer to a carbonated beverage filling process, although the apparatus, system and methods described herein relate to any similar type of filling process.

Further, the filling process cannot alter the food or beverage being filled. Thus, when planning a filling system it is important to match the appropriate filling steps to the beverage characteristics and container. The steps of the filling process include some or all of the following: evacuation of the container, flushing the container with gas, pressurizing the container with gas, filling the container with one or multiple speeds, fill level correction (in certain cases), and settling the product.

Evacuation is used mostly on rigid containers in which a vacuum process removes upwards of 90% of the air content in the container prior to pressurizing with gas. Evacuation becomes more important when the contents being filled are oxygen sensitive and the may be repeated at other times throughout the filling process. Additionally or alternatively, the container may be flushed with gas. This is done mostly with flexible containers, such as PET bottles and aluminum cans, which may not be able to withstand a vacuum. The flushing step takes place at the time that the fill valve is located at the container and usually uses gas from the filling ring bowl until both pressures are the same.

Next, filling takes place when the fill valve opens and the product flows over, around the vent tube, and into the container. As the container fills, gas in the containers is displaced by the product and flows through the vent tube and out of the container into the filler ring bowl, until the container is full. As an example, the vent tube may contain an electronic probe to detect product and stop filling. Accordingly, the vent tube vents the gases being used while filling the container with fluid. The process needs to be extremely accurate, and as a result, most vent tubes are designed at specific lengths to achieve each specific fill level per filling machine.

Fill level correction may be incorporated when the cost of product is high to save product. In the most commonly used fill level correction step, the container is first overfilled with product and then the product is extracted using a vacuum through the vent tube. Finally, by settling, the pressure in the container is lowered and the beverage is allowed to settle as it is lowered from the fill valve.

The vent tubes used in the filling process described above usually are configured with an elongated, hollow, cylindrical tube extending the length of the tube, which allows the vent tube to enter the container opening during the fill process without touching the container. As described above and in U.S. Pat. No. 3,736,966, which is incorporated by reference herein, the product can flow over the vent tube into the container. The lower tip of the vent tube is usually closed and one or more holes are provided so that any gas or air in the container can be displaced through the vent tube during the filling process, minimizing or eliminating the possibility of a container exploding during filling.

Additionally, vent tubes can be configured for canister filling by incorporating a ball cage and check ball assembly at the lower end of the vent tube for preventing gases from leaking during the filling operation. The ball or sphere is usually made up of a thermoplastic such as polypropylene, and is captured in the vent tube ball cage, but is free to move up and down (the z-axis) in the opening, as understood by one having ordinary skill in the art. When the ball moves to the top of the ball cage, the ball fits into the vent tube opening. The circumference of the ball is such that when it moves to the top of the ball cage, it will block the bottom of the vent tube opening thereby preventing gases from leaking.

However, as the captured polypropylene ball moves around in the vent tube, because the ball is spherical, the ball can rotate in all directions, in effect rotating inside the vent tube. To the extent that the polypropylene ball can move on the z-axis, it will function properly. To the extent that the polypropylene ball rotates and makes continuous contact with the insides of the vent tube ball cage, the ball may be deformed or reduced in size over time, which will lead to the ball falling out of or detaching from the vent tube ball cage. The ball may thus fall into a canister or container.

Traditionally, filling machines for glass containers use a vent tube made of stainless steel or a stainless food-grade plastic hybrid. For filling aluminum containers, the vent tube is usually made from some form of food-grade plastic, such as Delrin®. Vent tubes can also use a ball and cage system as described in U.S. Publication No. US20050199314 A1, which is incorporated by reference herein.

In certain instances, the high-speed automatic filling machines allow for removing and replacing the vent tube or a portion of the vent tube, such as the cap, as described in U.S. Pat. Nos. 4,049,030 and 5,878,797, which are incorporated by reference herein. In other situations, a removable vent tube cap or tip can be attached, either by using threads on the cap, a slot, a snap-in configuration or some other manner, as understood by one having ordinary skill in the art.

Due to the high speeds and constant use of these filling machines, occasionally a vent tube may detach from the filling machine and fall into the product container. When either of these event occur (the ball falling from the vent tube ball cage, or the vent tube falling from the filling machine), there are minimal systems in place to halt the filling process, locate the detached vent tube, or portion thereof (such as a cap) or ball, repair the filling machine and begin the process again.

Each minute that the process is halted equates to thousands of unfilled containers, as filling machines can run at speeds of 1650 cans per minute. Further, the longer the process continues the more filled containers that will have to be examined to find the detached vent tube or ball. In many situations, the containers filled with product that were boxed up or packaged after the vent tube or ball became detached are merely discarded, increasing the costs of the accident.

Similarly, counter pressure fillers or Isobaric Fillers are devices used to fill bottles or aluminum cans from a pressurized or non-pressurized bulk storage tank. The goal is to avoid a reduction in the carbonation of the liquid being filled, as understood by one having ordinary skill in the art.

Counter pressure fillers fill containers, canisters or bottles using a filling tube from the top of the container using a diffuser to distribute liquid around the walls of the container while filling. This reduces or avoids foaming of the liquid during the filling process. The center of the filling tube utilizes a smaller return tube fitted inside, which allows the carbon dioxide in the pressurized container to escape to the top of a filling tank.

This process provides for more product to fill the container while the carbon dioxide escapes the container. Although not used as much, the process can be completed by filling from the bottom up, but this is more expensive to implement. Fillers have two inputs-one for the carbon dioxide gas and the other for the actual liquid. Filler designs also include a vent to allow venting of gas from the top of the bottle during the filling operation. By controlling the vent and valves on each input, the pressure and speed of filling and venting can be controlled.

In use, a counter pressure filler fills the container by maintaining constant carbon dioxide gas pressure on the liquid as understood by one having ordinary skill in the art. The container is initially pressurized with the carbon dioxide, the fill valve is opened, and the carbon dioxide is vented to allow the container bottle to fill from the bottom.

Some of the current systems used to check for detached stainless steel vent tubes or the polypropylene ball include the use of inductive or capacitive sensors, vision systems or other ultrasonic inline systems. Additionally, systems for determining when a vent tube or polypropylene ball has become detached and fallen into a container include the electromagnetic detection fields or X-ray based technologies. Some of the manufactures of these technologies include Omron Corporation, Industrial Dynamics Company, and the Fortress Technology Inc, among others.

However, most of these inspection systems need to have direct access to each container after it has been filled with product, and are used as a way to detect the vent tube or polypropylene ball by examining each container. This process slows down the filling line either because each container must be examined, or takes longer time than necessary to find the container in which the vent tube or polypropylene ball has fallen if each container has not been examined.

Further, some of the systems work better with metal vent tubes, while other systems work better with plastic vent tubes or polypropylene balls creating inconsistencies, or the need for additional equipment when changing to different vent tubes. For example, when a plastic vent tube or a polypropylene ball falls into a can made of aluminum at a filling plant, the inductive and capacitive technologies cannot detect the plastic (foreign) object through the aluminum can.

There is currently no apparatus, system or method that incorporates an indicator or detector, such as an RFID tag or a magnet, into a novel flat bottom or oval pill device, ball cage, traceable vent tube, or removable vent tube tip or cap for use during filling operations, that increases the safety of the filling operation and reduces the costs and time when a malfunction occurs, such as when a vent tube or polypropylene ball inadvertently detaches from the filling machine and falls into the container or canister.

There is also no apparatus, system or method relating to novel flat bottom and oval pill devices, ball cages, traceable vent tubes, or removable vent tube tips or caps incorporating an RFID tag or a magnet or another traceable material that allows for a quicker and more accurate determination of the occurrence and location of a vent tube or ball that has become detached from a filling machine during filling operations. The present disclosure satisfies these needs.

SUMMARY OF THE DISCLOSURE

In order to solve the above-mentioned shortcomings in filling operations, the present disclosure utilizes apparatus, system and/or methods for determining the location of a novel flat bottom or oval pill device, ball cage, traceable vent tube, or removable vent tube tip or cap when the filling machine malfunctions and one of these devices, or a portion thereof, becomes detached from the filling machine and, in special cases, falls or intrudes into a container being filled. In particular, the disclosure utilizes a novel flat bottom or oval pill device, ball cage, traceable vent tube, or removable vent tube tip or cap modified in some way with a traceable material, such as an RFID tag or a magnet, and can incorporate a system and methods for scanning a filling machine, as well as food or beverage containers, using sensing technologies, such as RFID technology.

Additionally, the modified pill device, such as the flat bottom or oval pill device design, differs from the standard polypropylene or thermoplastic ball in that the shape of the pill device is oblong and not spherical. The modified shape allows the pill device to continue moving in the z-axis inside the ball cage without tumbling. Thus, the pill device is capable of performing its intended function of moving up on the z-axis to engage the vent tube opening to prevent the escaping of gases when needed.

Although other designs are possible, the modified pill device design disclosed herein differs from the polypropylene or thermoplastic ball in that the shape of the pill device is oval or spherical on the first side and either oval or spherical, or flat or beveled on the second side, and not spherical on the second side. As such, the first novel pill device design is oval or spherical on one side and flat bottom or beveled on the other side, while the second novel pill device design is oval or spherical on both sides. Other designs can be incorporated in which the shape allows the particular device to continue moving in the z-axis inside a ball cage without tumbling. Thus, the pill device is capable of performing its intended function of moving up on the z-axis to engage the vent tube opening to prevent the escaping of gases when needed.

The shapes described above also allow for the incorporation of an RFID tag or another indicator in a location in the novel pill device such that the RFID tag (or whichever device is used to track the device), is always in the same relative location in the ball cage. For example, since the shape of the novel pill device limits the device rotation inside the ball cage, the RFID tag or other indicator will always be on a plane perpendicular to the direction of the vent tube, if that is the desired location. Other orientations can be used to meet systems requirements. Since the shape of the novel pill device only allows for rotation or movement in one axis (besides the z-axis), there will be less contact with the inside of the ball cage and less damage to the novel pill device as it is used in the filling operation.

As such, the present disclosure solves the problems facing the packaging industry, and in particular, the beverage filling industry as described above. The present disclosure incorporates a solution for consistent detection of a novel flat bottom or oval pill device, ball cage, traceable vent tube, or removable vent tube tip or cap intrusion into a container, which will exceed the current standards at specific beverage manufacturing plants.

At large automated beverage manufacturing plants, aluminum cans are a commonly used container for product. As described above, when a plastic vent tube or a propylene ball falls into an aluminum can as it is being filled, the inductive and capacitive technologies normally used to detect metal vent tubes or thermoplastic balls, cannot detect the foreign object through the aluminum can. As a result, expensive X-ray systems must be used or the product is considered wasted.

The present disclosure solves this inherent problem by incorporating or implementing an RFID tag or a magnet into each novel flat bottom or oval pill device, ball cage, traceable vent tube, or removable vent tube tip or cap and associated monitoring systems. The incorporated RFID tag can be used on metal, metal-plastic hybrid, ball cage, plastic vent tubes, vent tube caps and into the novel pill device designs with the same result. By placing an in-line identification gate or RFID scanner or reader, or another similar reader, after the filling process occurs, and a continuous monitoring system on the filling machine any such pill device, ball cage, traceable vent tube, or removable vent tube tip or cap can be reliably tracked if it becomes detached from the filling machine during the filling process.

By tagging the pill device, ball cage, traceable vent tube, or removable vent tube tip or cap with an RFID transponder, a magnet or other tagging technologies, routine consistency checks will not have to be performed. Further, other materials may now be considered as containers for the packaging side of the manufacturing facilities.

The vent tube and pill device detection systems used in conjunction with the present disclosure has several components, such as chips, tags, readers and antennas. By incorporating an RFID tag, transponder, or other tagging technology into the vent tube or pill device designs, these devices can be tracked using the same transponder or tag reading system as described above.

Since, in the case of an RFID tag, the transponder is created by attaching a small silicon chip to a small flexible antenna; the chip can be used to record and store information. To read the transponder and locate the specific vent tube or pill device designs, the RFID reader sends out a radio signal to be absorbed by the antenna and reflected back as a return signal delivering information from the transponder chip memory.

In use, the container filling machine operates in its normal manner with empty containers sent down a conveyor to the filling section of the system. The vent tube (with or without the pill device designs) is then lowered (or the empty container is raised) to come in contact or near contact with the container. The container is filled with the product as described above, and the pill device, ball cage, traceable vent tube, or removable vent tube tip or cap is removed from the filled container. The filled container is then covered and/or sealed. This filling process fills thousands of containers each minute.

In the present disclosure, a traceable vent tube cap can be attached to an existing vent tube to allow standard vent tubes to become traceable vent tubes. Alternatively, the modified pill device design containing a traceable device can be used in a ball cage instead of a polypropylene ball, to allow standard vent tubes or ball cages to become traceable vent tubes or ball cages.

If, during these high-speed operations, a vent tube malfunctions (i.e., the vent tube, ball cage or pill device detaches or sheers from the filling machine, and falls into the container), the RFID transponder incorporated into the vent tube, vent tube cap, modified pill device (or a combination of the devices) will likewise fall into the filled container.

Using the vent tube detection system, the system can have immediate information that the vent tube has detached from the filling system and precisely which container the pill device, ball cage, traceable vent tube, or removable vent tube tip or cap is located. Depending on the type of system and the indicator being used, the reader of the vent tube detection system can be anywhere from 1 foot to 20 to 30 feet from the location of the container or filling machine. Further, handheld RFID tag or magnetic readers can be used at the time of the malfunction to assist in finding the broken pill device, ball cage, traceable vent tube, or removable vent tube tip or cap.

The pill device, ball cage, traceable vent tube, or removable vent tube tip or cap detection system can be set up at various locations in the filling plant in order to make sure that a pill device, ball cage, traceable vent tube, or removable vent tube tip or cap has not become accidentally detached into a filled container before the container is shipped out of the plant.

These and other aspects, features, and advantages of the present disclosure will become more readily apparent from the attached drawings, the detailed description of the preferred embodiments, and the recited claims, which follow.

DRAWINGS

The preferred embodiments of the disclosure will be described in conjunction with the appended drawings provided to illustrate and not to the limit the disclosure, where like designations denote like elements, and in which.

DETAILED DESCRIPTION

As described herein, product, such as cola or beer, is transferred from the production, brewing or fabrication stage to the packaging stage to be individually packaged for sale. This transfer process is known as the fill or filling process and utilizes automatic high-speed filling equipment to fill and seal thousands of containers each minute. Often, these automatic filling machines are of the rotary filler type, which may vary in size from 40, 60, 72, 100, 120 or 180 fill valves and vent tubes per machine, allowing for the filling of thousands of containers each minute that the machine is in use.

Figure 1:
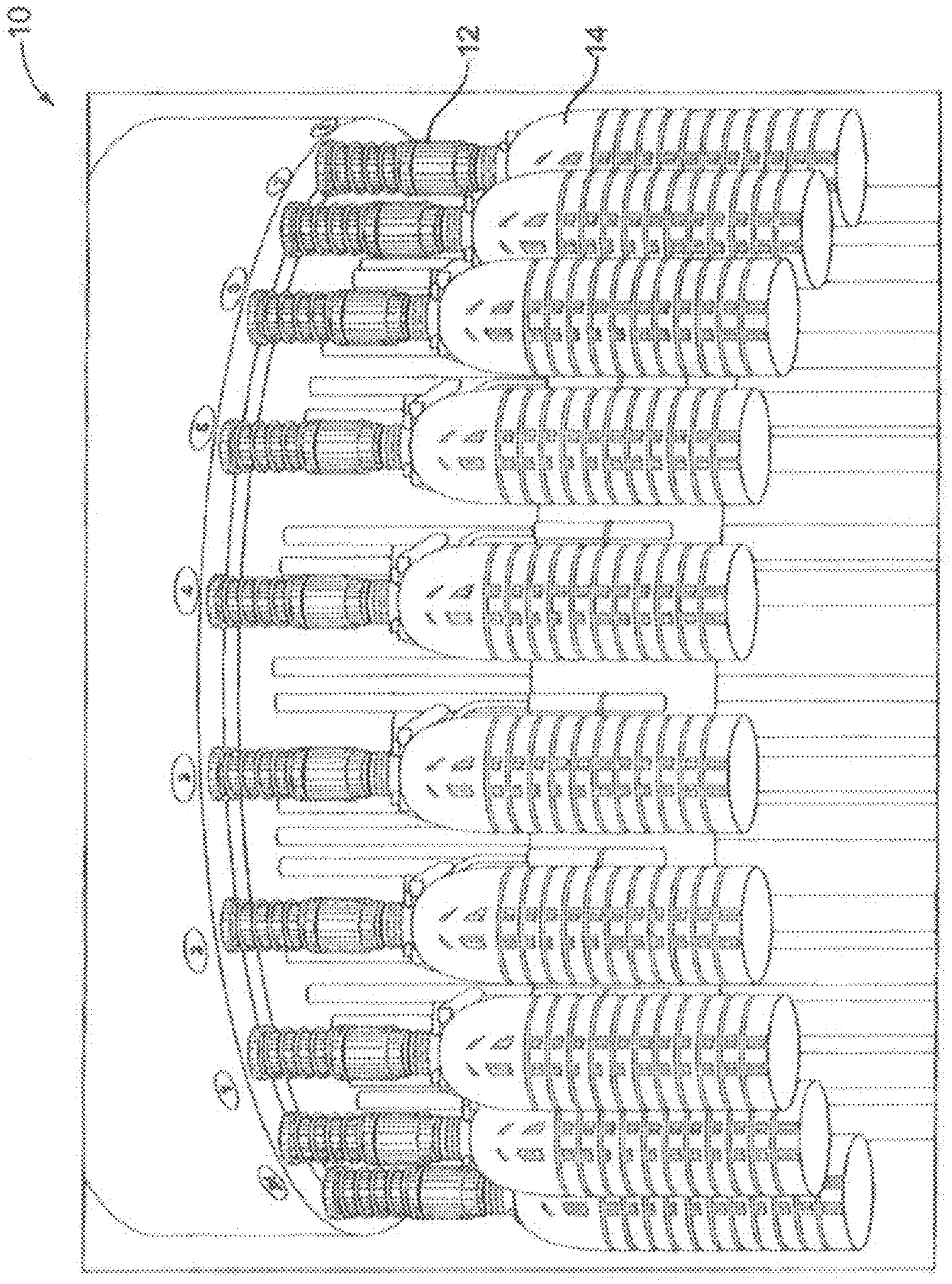
FIG. 1 (Prior Art)
FIG. 1 illustrates a filling machine in accordance with one embodiment of the present disclosure.

FIG. 1 shows a typical rotary bottle or can filler 10, such as one manufactured by KHS AG, which incorporates vent tubes 12 in the filling (and venting) process. In general terms and as described in more detail herein, a vent tube 12 come in contact or near contact with a container 14 prior to filling the container 14 with the product (not shown). Once a container 14 is in the correct position, product can be transferred to the container 14 with air or gas in the container displaced through the vent tube 12. The container is then sealed or seamed (not shown).

For glass containers 14, the vent tube 12 is usually made of stainless steel, but can be made of a food grade plastic, stainless steel hybrid. For aluminum containers, the vent tube 12 is usually made of a food grade plastic material. In a vent tube ball cage, a food grade plastic ball is used to start and stop the flow of gas.

Due to the high speeds where thousands and tens of thousands of containers are filled each minute, and due to the constant use of these filling machines 10, occasionally a vent tube 12 or other device used in the filling process, may detach from the filling machine 10 and fall into the product container 14. If and when this event occurs, there are a few primitive systems in place to locate the vent tube 12 and halt the filling process before thousands of additional containers are filled, making it more difficult to locate the container 14 with the broken vent tube 12 (or other device).

Figure 2:
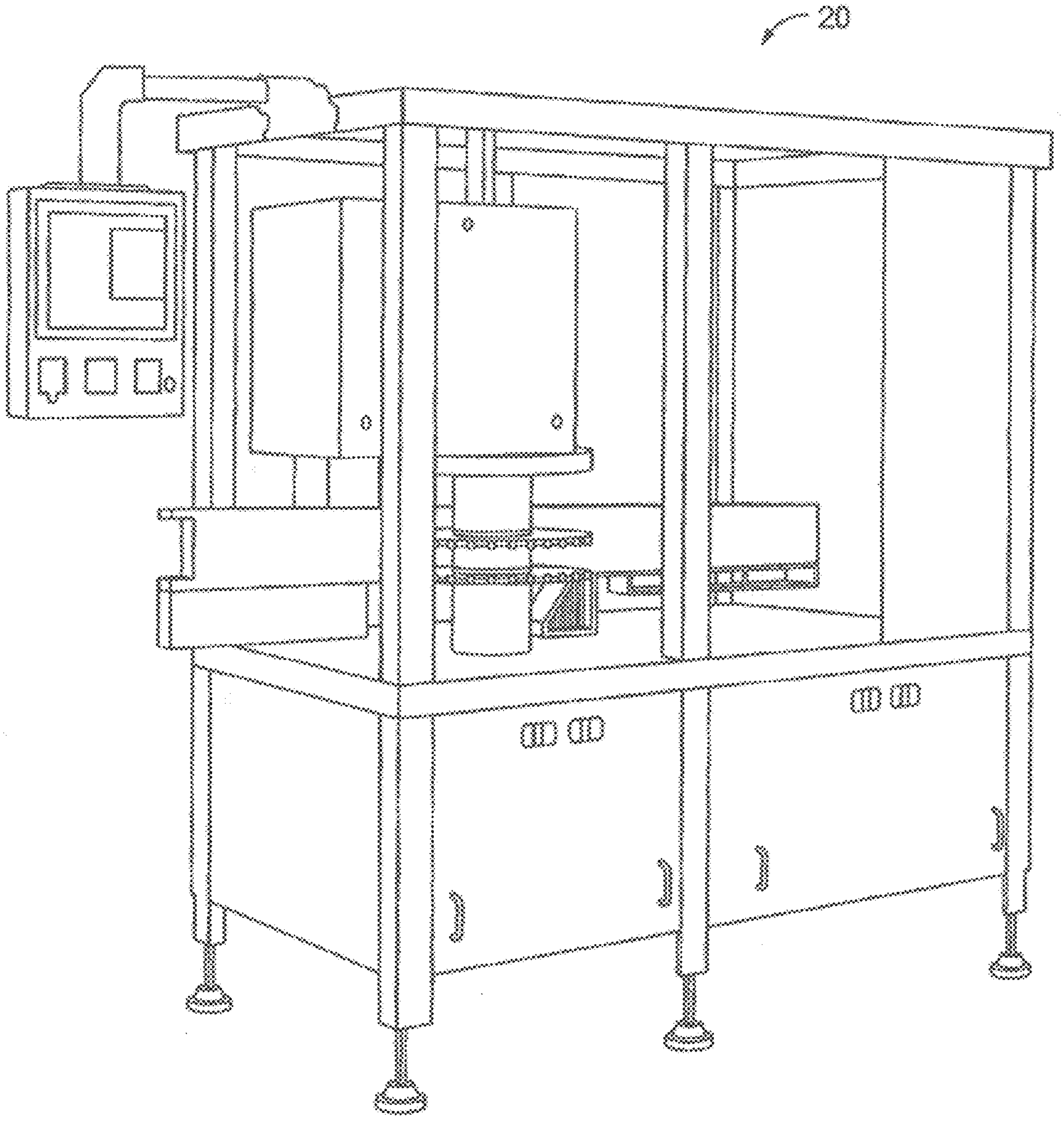
FIG. 2 (Prior Art)
FIG. 2 illustrates an inspection system for inspecting empty and full containers in accordance with the present disclosure.

FIG. 2 shows a typical container inspection machine 20, such as from the manufacturer Industrial Dynamics/filtec, in which each filled container must pass before each container can be packaged and distributed. As described herein, these inspection machines 20 utilize various technologies to sense imperfections in the filling process, including when a foreign material, such as a vent tube, falls into a container. The technologies include using inductive and capacitive sensors, vision systems or other ultrasonic inline systems. However, in most of these systems, each container must be individually scanned or tested. For example, the vision system utilizes a light shined through each container (assuming glass or some other translucent material) and a video/vision camera that compares the viewed filled container against a table for any discrepancies. These systems generally slow down the filling process, are expensive and do not always detect a vent tube 12 that has inadvertently detached from the filling machine.

In accordance with the present disclosure, the vent tube (or other devices as shown in FIGS. 3, 5 and 7-10, and described herein) used in the fill process is configured to incorporate a traceable material, such as an RFID tag, a magnet, or in some cases, both. A scanning system and/or method can then be incorporated to check for malfunctions in the filling process and in which container a malfunctioning vent tube has landed. Further, other types of traceable materials can be used without deviating from the scope of the disclosure.

Figure 3A:
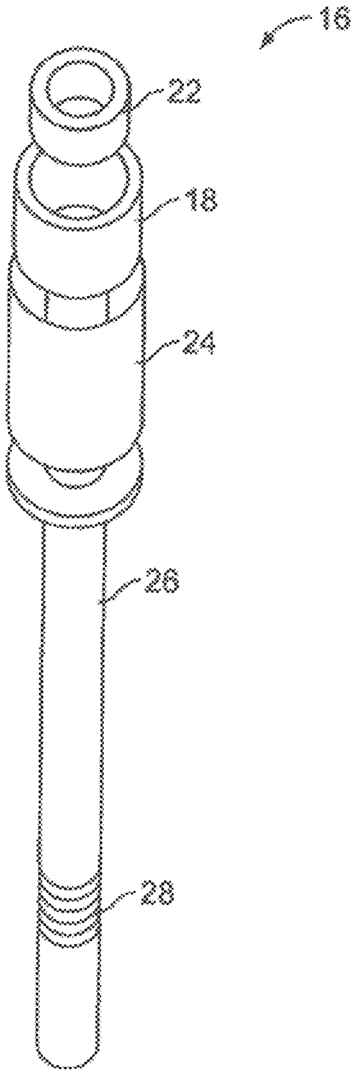
FIGS. 3A and 3B illustrate a vent tube incorporating indicators in accordance with an embodiment of the present disclosure.
Figure 3B:
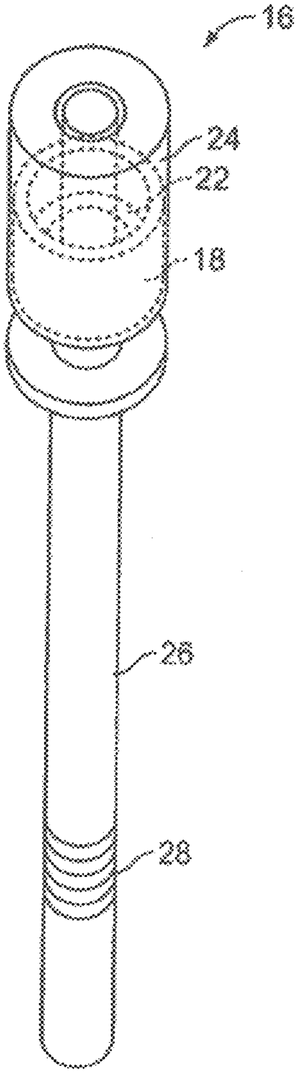

FIGS. 3A and 3B show an exploded view and an assembled view of a vent tube 16 containing a traceable material, respectively. The vent tube 16 comprises one or more of an RFID tag 18, a magnet 22, a vent tube head 24, a hollow cylindrical body 26 and indentations 28 for assisting in connecting to the filling machine.

As described herein and in the preferred embodiment, the vent tube 16 incorporates an RFID tag 18 for detection when the vent tube detaches from the filling machine 10. The vent tube 16 can be manufactured from material that will be determined by the standards of the food and beverage industry for each application. The RFID tag 18 can be attached to, or housed or enclosed in, the vent tube 16 through a machining or injection molding process as understood by one having ordinary skill in the art, such that in the preferred embodiment the RFID tag 18 is attached to, or housed or enclosed in, the vent tube head 24.

The vent tube may also incorporate a magnet 22 for additional detection purposes. In some instances, the vent tube only uses a magnet 22 and not the RFID tag 18. In accordance with the present disclosure, an RFID tag or other traceable material 18 can be placed on any type of vent tube used in the filling process, including vent tube ball cages. Similar to the RFID tag above, the magnet 22 can be attached to the vent tube 16 in the same manner. The present disclosure can utilize the RFID tag 18 alone or in conjunction with the magnet 22.

RFID systems have several components, such as chips, tags, readers and antennas, which can be used to determine the location of an RFID tag (and any item that the tag is attached to) from a distance away. In its simplest form, a small silicon chip is attached to a small flexible antenna to create a tag. The chip is used to record and store information and when a tag is to be read, the RFID reader or scanner send out a radio signal. The tag absorbs some of the RF energy from the reader signal and reflects it back as a return signal delivering information from the tag's memory.

The RFID tags 18 do not require a battery, as the power is supplied by the identification gate as understood by one having ordinary skill in the art. Any type of RFID tag 18 can be used in the present disclosure, Ultra-High Frequency (UHF), High Frequency (HF), and Low Frequency (LF), each providing its own advantages and disadvantages. The higher the frequency, the longer the range for detection; while the lower the frequency, the less power that is needed for the tag to operate. Ranges of 20 to 30 feet are obtainable for the UHF RFID tags, while the HF and LF RFID tags operate at approximate distances of 1 meter and 1 foot, respectively.

As an example, UHF tags operate within the 800 and 900 MHz band and provide a response from a range of 20-30 ft. RFID tags operating in the UHF range can transfer data much faster than RFID tags operating in the HF and LF bands. However, UHF RFID tags require more power than those operating at the HF and LF bands, and are suited more for applications when sensing through low-density materials.

RFID tags operating in the HF range primarily operate at 13.56 MHz. These tags require a read distance typically of about 1 meter, and work well when sensing through metal and liquids. RFID tags operating in the LF band have an operating frequency of 125 kHz and work well sensing through product or materials with a high concentration of water. These LF tags must be read with equipment within about a one-foot range. However, these LF RFID tags require the least amount of power of the three RFID tags described herein.

RFID readers or scanners are generally composed of a computer and a radio. The computer manages communications with the network or through the Programmable Logic Controller (PLC). The radio controls communication with the RFID tag, typically using a language dictated by a published protocol, such as the EPC Class 1 specification.

When the vent tube 16, or other devices, of the present disclosure, containing the RFID tag 18, is used in the filling process, an inspection system, such as an RFID reader, can be incorporated into the filling line or in numerous other locations to continuously check for vent tubes 16 that have detached from the filling machine 10. As soon as a vent tube 16 containing an RFID tag 18 detaches from the filling machine 10, the RFID reader determines that the vent tube 16 is no longer in the correct location and can be used to find the container 14 in which the vent tube 16 is located. This entire inspection and determination procedure takes seconds and can be incorporated into the filling system to immediately shut down the filling process as understood by one having ordinary skill in the art before many more containers are filled.

In an embodiment, the system and methods of the present disclosure comprise incorporating or housing an RFID tag or transponder in a stainless steel vent tube, for use in glass bottle filling for example, and a plastic vent tube, for use in aluminum can filling for example. The vent tube may also incorporate a magnet along with the RFID transponder. Using an additional traceable material, such as a magnet, increases the detection of the vent tube in certain situations such as when the vent tube falls into an aluminum can and is sealed attenuating the signal.

Figure 4:
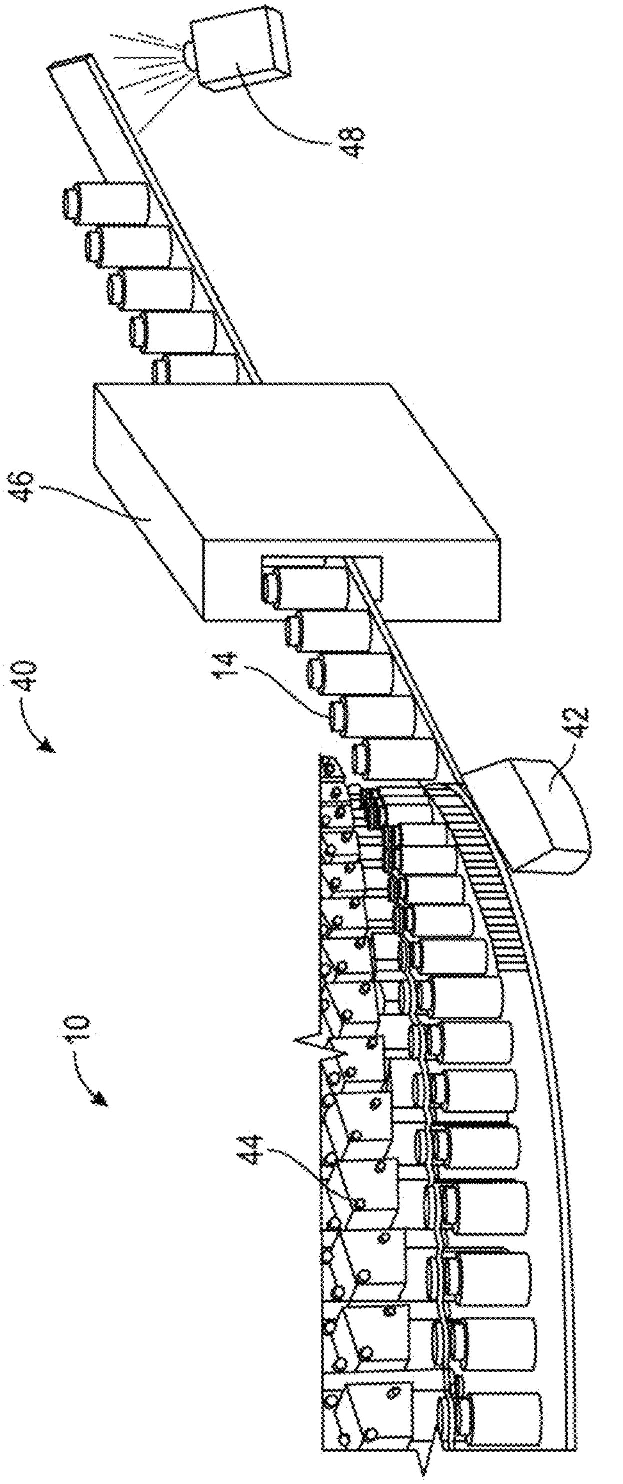
FIG. 4 illustrates an exemplary indicator detection system in accordance with an embodiment of the present disclosure.

The embodiment of the system 40 and method is shown in FIG. 4, in which there are three points of detection or identification of the vent tubes 16 during the filling process. The first point of detection 42 takes place while the vent tubes 16 are attached to the filler machine 10. An RFID reader 42 is placed close to the filler 44 in a section where no containers 14 are present. As the filler 44 rotates in operation the reader 42 continuously reads the RFID tags 18 that are imbedded in the vent tubes 16 to ensure one or more has not become detached during the filling process. This section 42 of the system 40 will alert the operator if a vent tube 16 becomes detached from the filler 44 and will also provide data indicating the specific filler vent tube 16 position.

The second point of detection 46 takes place on the line after the container 14 has been seamed or sealed. This section 46 of the system 40 utilizes magnetic and inductive sensor technologies to detect the imbedded magnet 22 in the vent tube 16 (or the stainless steel vent tube). This section 46 of the system 40 provides an output to the operator that can be used in an auto reject system or at the operator's discretion.

The third point of detection utilizes a handheld RFID reader 48. After the first 42 or second 46 detection process has identified a vent tube detachment, the operator can now scan the specific can or bottle with the handheld scanner 48 in order to verify the location of the detached vent tube 16.

The present disclosure does not have to incorporate each of these detection points, and the system can use one or any combination of these detection points to detect and locate a malfunctioning vent tube or a vent tube that has broken off the filling machine.

The first point of detection, the RFID reader 42, which incorporates an antenna, can be integrated (i.e., through an RFID hardware and/or software integrator) into a local network at the filling site, or it can be connected through a global communications network, such as the Internet, to a remote site as understood by one having ordinary skill in the art. As such, the information received by the reader 42 at the antenna can be transmitted to a number of locations for informational purposes such as record keeping.

Further, the second 46 and third 48 points can also be integrated into the system as a whole. Additionally, the system is not limited to three detection points, as the system is scalable and additional detection points can be added for other filling lines and for other scanning purposes, such as to make sure that none of the filled containers being loaded onto a truck have a broken vent tube located inside.

Also, each of the detection points can utilize one or more of the detection methodologies. So for example, the first point of detection 42 may only read RFID tags, while the handheld scanner 48 may be configured to scan for both RFID tags and the magnet.

Other embodiments for determining a malfunction in the filling process 10, such as a vent tube 16 detaching from a filling machine 10 and falling into a container 14 include determining the temperature variant in the bottle as the temperature will change quickly when a vent tube 16 falls into the container 14 filled with product. This embodiment employs measuring the temperature variant in the bottle 14 to detect if a vent tube 16 is present. In a similar manner, determining the change in bottle 14 capacitance, whereby the system measures the capacitance and/or change in capacitance in the bottle 14, can be used to detect an inadvertent vent tube 16. In this embodiment, a charge is applied to the bottle 14 and the system measures charge or discharge time.

Another embodiment for detecting a detached vent tube 16 include utilizing an inductive sensor, where a ferrous material 22 is injection molded inside or into the vent tube 16, or a Hall Effect sensor, where a magnet 22 is injected molded inside or into a vent tube 16. Additional sensors can be used to detect a modified vent tube 16 using Ultra Sonic, Infrasonic or Infrared sensors, or with the use of vision sensors.

Figure 5:
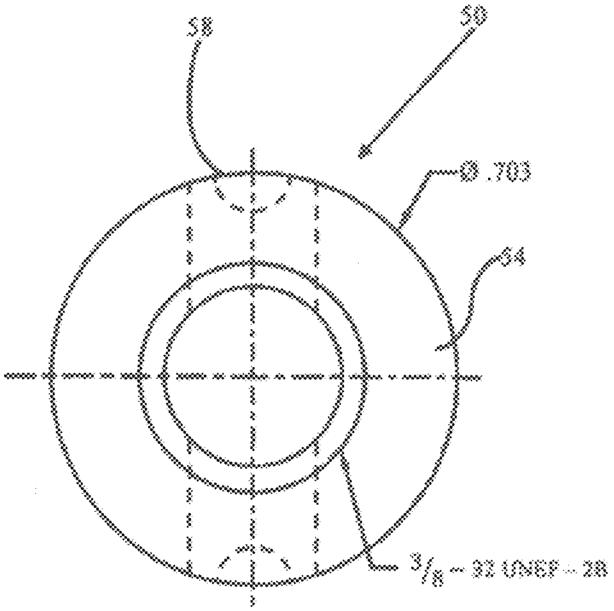
FIG. 5 illustrates an exemplary replaceable and/or traceable vent tube cap incorporating an indicator in accordance with an embodiment of the present disclosure.
Figure 5:
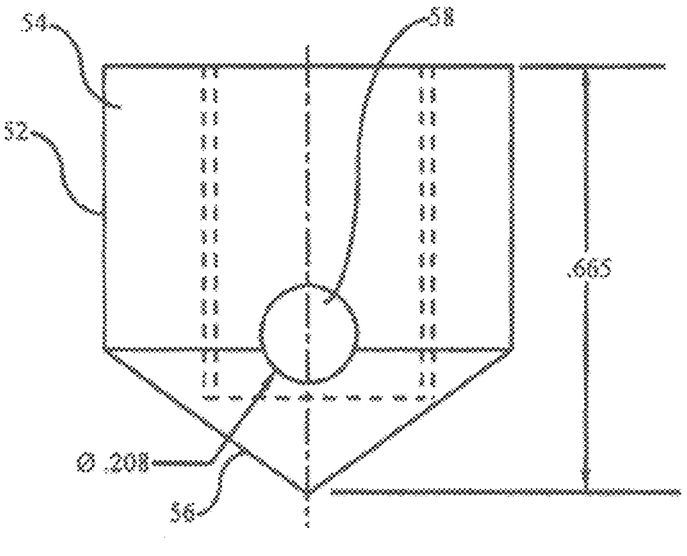

FIG. 5 shows an alternative embodiment in accordance with the present disclosure. The replaceable and traceable vent tube cap 50 shown from top and side views is also used in the fill process and is configured to incorporate a housing 52, a traceable material 54, such as an RFID tag, a magnet, or in some cases, both, and a tapered end 56, for easy insertion into the canister to be filled. A cavity or evacuation hole 58 there through allows for the evacuation of air or gas from the canister prior to filling, as described herein.

The vent tube cap 50 can be attached to existing vent tubes in order to retrofit the vent tube to become traceable in accordance with the monitoring system described herein. The vent tube cap 50 can be configured with screw threads, a slot or slots, a snap-in configuration, or some other manner, as understood by one having ordinary skill in the art, to be attached to the existing non-traceable vent tube. Other configuration, as described in the prior art references disclosed above, can be incorporated to allow the vent tube cap 50 to be attached to the existing vent tube.

As detailed above, the scanning system 40 and/or method can then be incorporated to check for malfunctions in the filling process, and to determine in which container a malfunctioning vent tube containing a traceable vent tube cap 50 has inadvertently fallen into the filled bottle, for example. By using the traceable vent tube cap 50 with an existing non-traceable vent tube, the retrofit vent tube can now be tracked by the scanning system 40.

Figure 6:
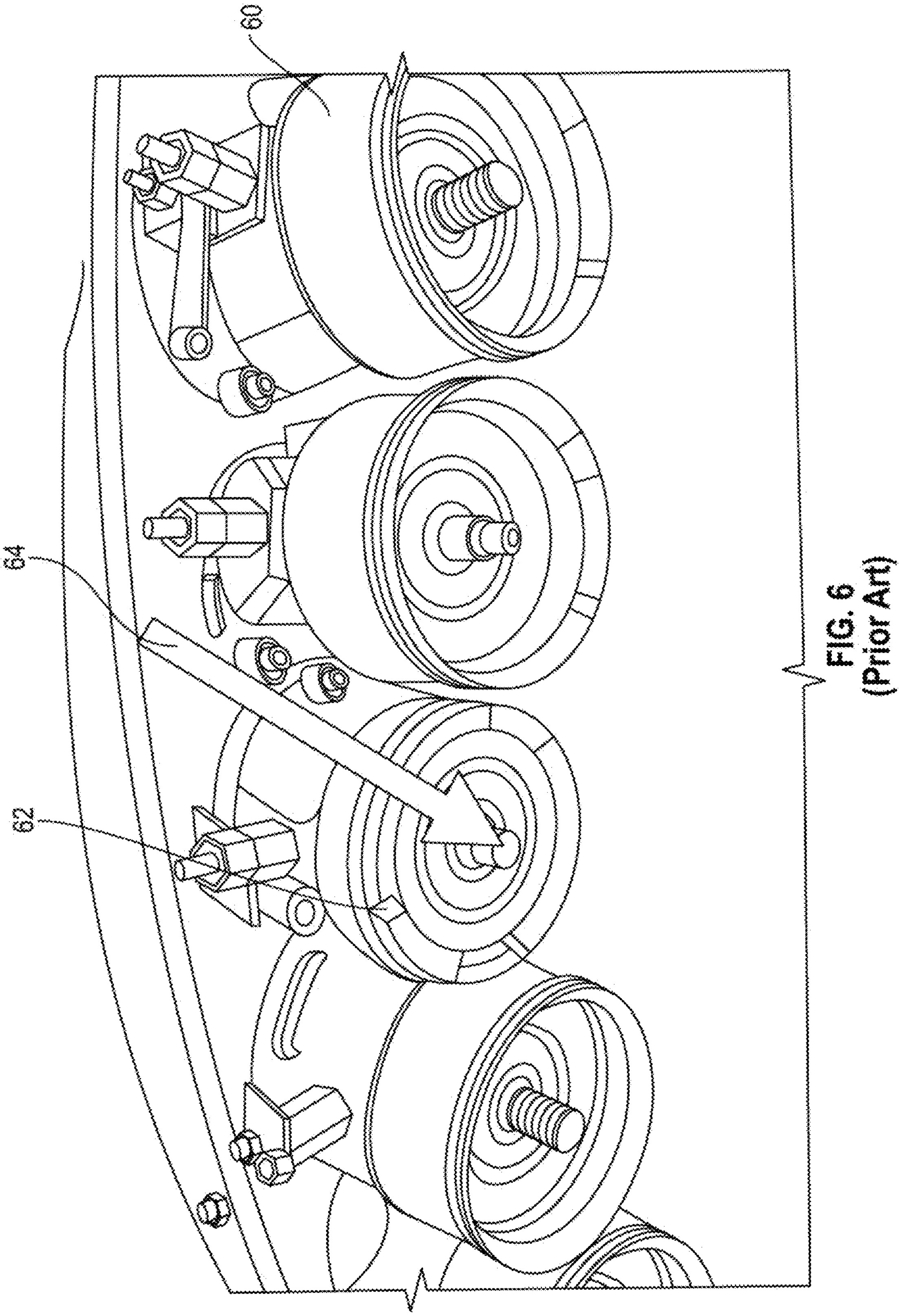
FIG. 6 (Prior Art)
FIG. 6 illustrates an exemplary portion of a standard filling machine indicating a standard vent tube.

FIG. 6 shows a cutaway portion of a filling machine 10 at the location in which a container or canister would engage during the filling process. Each of the quick change valve bells 60 shown as an example would engage an empty container prior to filling as described herein. As understood by one having ordinary skill in the art, each of the bells 60 can be removed (see valve bell 62 for example) for maintenance or to be replaced with a different device for filling a different size container. In the center of each valve bell 60, among other elements, is the vent tube 64. As described herein, when the container is temporarily connected to the filling machine, the vent tube 64 evacuates the container while it is being filled.

Figure 7A:
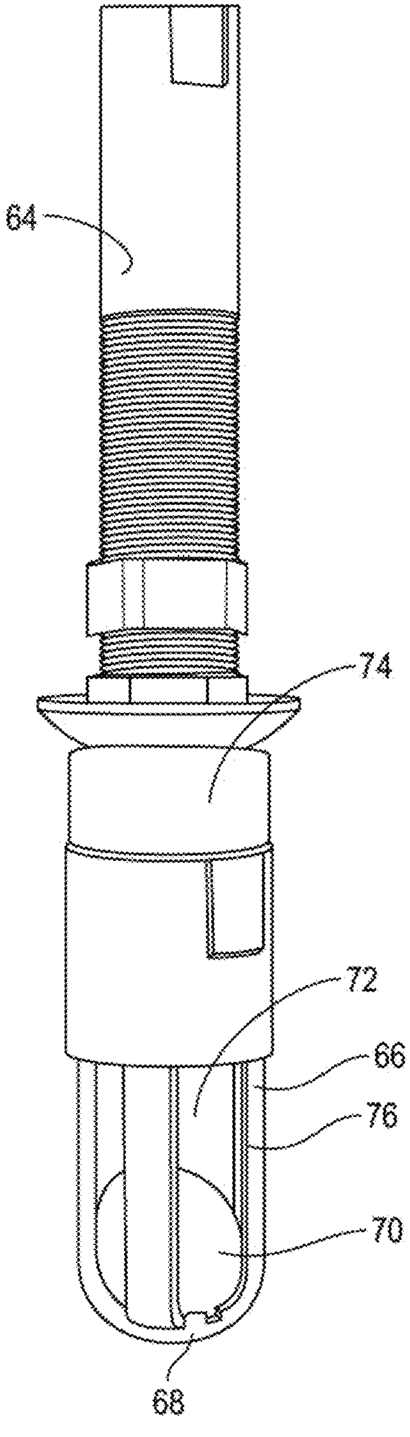
FIG. 7A (Prior Art)
FIG. 7A illustrates an exemplary vent tube ball cage incorporating a standard ball in accordance with the prior art.

FIG. 7A shows a close up of a standard vent tube 64 comprising a standard ball cage 66 at the lower end 68 of the vent tube 64 and a ball or sphere 70 captured in the ball cage 66. As described herein, the ball 70 is usually made up of a thermoplastic such as polypropylene, and is free to move up and down the z-axis in the ball cage opening 72, as understood by one having ordinary skill in the art. When the ball 70 moves to the top of the ball cage 74, the ball 70, which is configured with a diameter slightly larger than that of the vent tube opening (not shown), will block the vent tube opening thereby preventing gases from leaking into the vent tube 64.

Because the captured polypropylene ball 70 is spherical, it can move or rotate around in the vent tube 64. To the extent that the ball 70 can move on the z-axis, it will function properly. To the extent that the ball rotates and makes continuous contact with the insides 76 of the vent tube ball cage 66, the ball 70 may become deformed or reduced in size over time, which will lead to the ball falling out of or detach from the vent tube ball cage 66, creating the problems described herein.

Figure 7B:
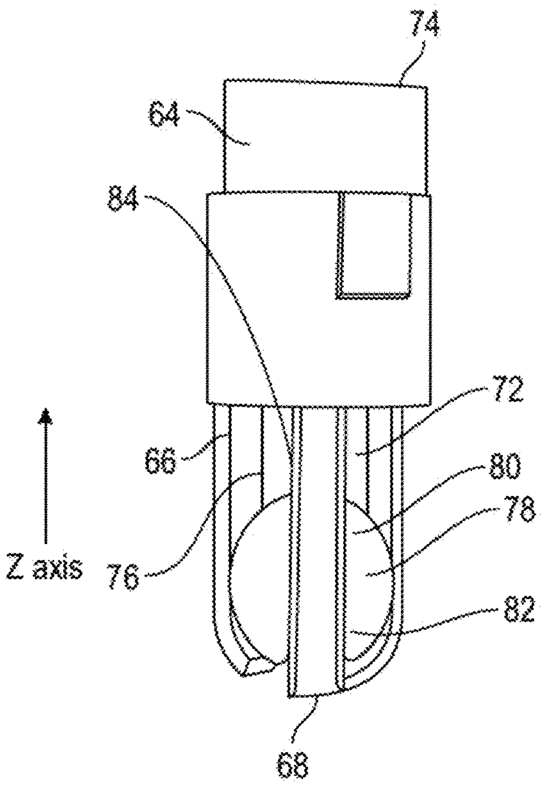
FIG. 7B illustrates an exemplary vent tube ball cage incorporating a modified pill device in accordance with an embodiment of the present disclosure.

FIG. 7B likewise shows a close up of a vent tube 64 comprising a ball cage 66 at the lower end 68 of the vent tube 64. However, the device located inside the ball cage 66 is a modified pill device that is oblong in shape with oval or spherical ends 78, different from the ball 70, which is spherical in its entirety. The pill device is also captured in the ball cage 66, and is usually made up of a thermoplastic such as polypropylene, although other materials can be used. The pill device 78 is free to move up and down along the z-axis, and can rotate in one axis inside the ball cage opening 72, but cannot rotate in other axes as the spherical ball 70 can rotate.

The pill device 78 has a top portion 80 and a bottom portion 82. The top portion 80 is designed with a top end 84 having a diameter larger than the vent tube opening, such that when the pill device 78 moves up the z-axis to the top of the ball cage 74, the pill device 78 will likewise block the vent tube opening thereby preventing gases from leaking into the vent tube 64.

Figure 8A:
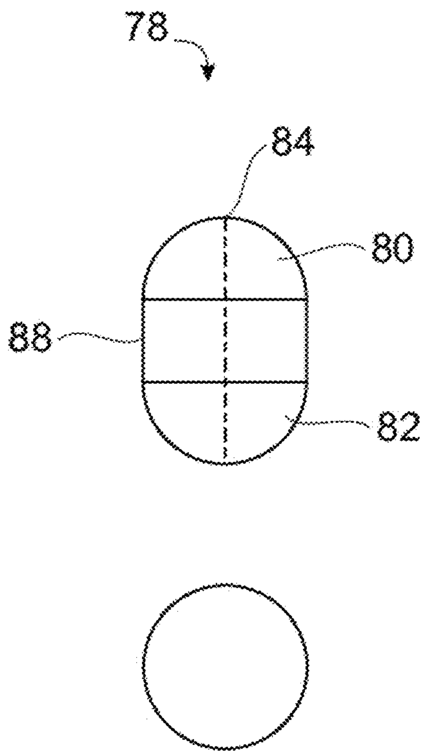
FIGS. 8A and 8B illustrate an exemplary modified pill device incorporating an oval design in accordance with an embodiment of the present disclosure.
Figure 8B:
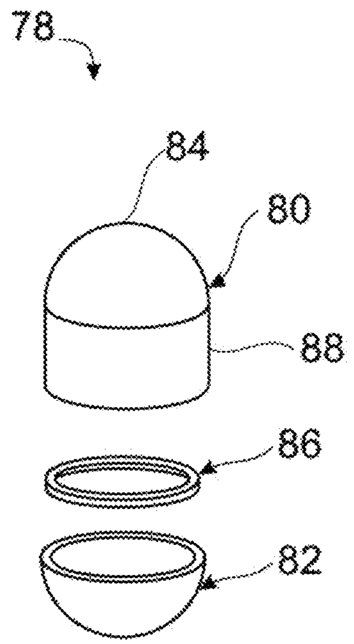

FIGS. 8A and 8B show an example of a pill device 78 in accordance with the present disclosure. The exemplary pill device comprises two portions, the top portion 80 and the bottom portion 82, along with an RFID tag (or other indicator) 86 that is located between the top portion 80 and the bottom portion 82. The location of the RFID tag 86 in between the top portion 80 and the bottom portion 82, keeps the RFID tag 86 in a consistent and predetermined plane related to the direction of travel (for example, along the z-axis) of the pill device 78 inside the ball cage 66 and attached to the vent tube 64. In doing so, the antenna of the reader 42 will be able to determine if the pill device 78 is still located in the vent tube ball cage 66.

In the example, the top portion 80 comprises the top end 84 and a cylinder portion 88, which lies below the top end 84. It is the cylinder portion 88, which is configured to keep the pill device 78 from rotating in an unwanted direction during the filling process. In the preferred embodiment, the top end 84 has a diameter of 0.385 inches, and the cylinder portion 88 has a cylinder height of 0.06 inches, although other sizes and configurations can be incorporated to keep the RFID tag properly oriented for reading functionality. The top portion 80 and the cylinder portion 88 can be two separate pieces or integrated as a single piece. Likewise, the entire pill device can be molded as a single piece, including the encapsulation of the RFID tag 86.

Figure 9:
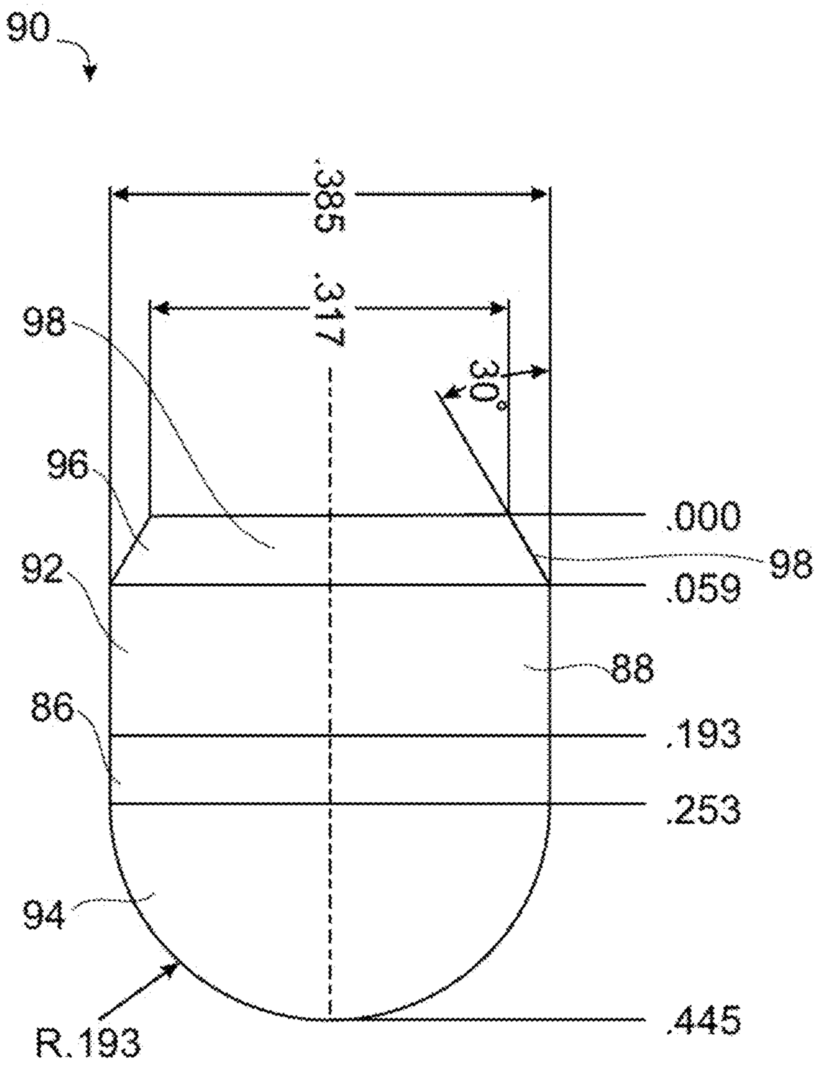
FIG. 9 illustrates an exemplary modified pill device incorporating a flat bottom design in accordance with an embodiment of the present disclosure.

FIG. 9 shows an example of another modified pill device incorporating a flat bottom and/or a beveled edge 90 in accordance with the present disclosure. Like the pill device 78, the flat bottom pill device 90 is oblong in shape, different from the ball 70, which is spherical. The flat bottom pill device 90 can also captured in a ball cage 66, and is usually made from a thermoplastic such as polypropylene, although other materials can be used. The flat bottom pill device 90 is free to move up and down the ball cage 66 along the z-axis, and can rotate in one axis inside the ball cage.

Similar to the pill device 78, the flat bottom pill device 90 has a top portion 92 and a bottom portion 94. The top portion 92 is designed with a top end 96 having a beveled and/or flat portion 98. The bottom portion 94 is oval, curved or spherical with a radius that is larger than the vent tube opening (not shown), such that when the flat bottom pill device 90 moves up the z-axis to the top of the ball cage 74, the bottom portion 94 of the flat bottom pill device 90 will likewise block the vent tube opening, thereby preventing gases from leaking into the vent tube 64. In an exemplary embodiment, the flat bottom pill device 90 has a diameter of 0.385 inches, with the bottom portion 94 being 0.192 inches high and having a radius of 0.193. The cylinder portion 88 is 0.134 inches high, and the beveled or flat bottom portion 96 is 0.059 inches high with a beveled edge 98 at 30 degrees, and a bottom edge diameter of 0.317 inches.

Similar to the pill device 78, the flat bottom pill device 90 comprises an RFID tag 86 that is located between the top portion 92 and the bottom portion 94. In the exemplary embodiment, the RFID tag 86 of the flat bottom pill device 90 is 0.060 inches high. The location of the RFID tag 86 in between the top portion 92 and the bottom portion 94, and keeps the RFID tag 86 in a consistent and predetermined plane related to the direction of travel (for example, along the z-axis) of the flat bottom pill device 90 inside the ball cage 66 and attached to the vent tube 64. In doing so, the antenna of the reader 42 will be able to determine if the flat bottom pill device 90 is still located in the vent tube ball cage 66.

In the design of the exemplary flat bottom pill device 90, the top portion 92 comprises the top end 96 and the cylinder portion 88, which lies at the bottom of the top end 96. It is the cylinder portion 88 that is configured to keep the flat bottom pill device 90 from rotating in an unwanted direction inside the ball cage 66 during the filling process.

In the exemplary embodiment of the flat bottom pill device design 90, the top end 96 of the top portion 92 has a diameter of 0.385 inches at its wide end (the same diameter as the flat bottom pill device design), and 0.317 inches at its narrow end, and a top end height from top of the top portion to the bottom of the top portion of 0.059 inches. This configuration creates a 30 degree beveled edge 98, although other beveled edge configurations will suffice.

The top end 96 and the cylinder portion 88 can be two separate pieces or integrated as a single piece. The bottom portion 94 and the RFID tag 86 can also be two separate pieces or integrated as a single piece. Likewise, the entire flat bottom pill device (or any of the individual portions) can be molded as a single piece, including the encapsulation of the RFID tag 86. Other sizes and configurations can be incorporated for these designs and measurements to keep the RFID tag or other indicator properly oriented for reading functionality during the fill process.

Figure 10:
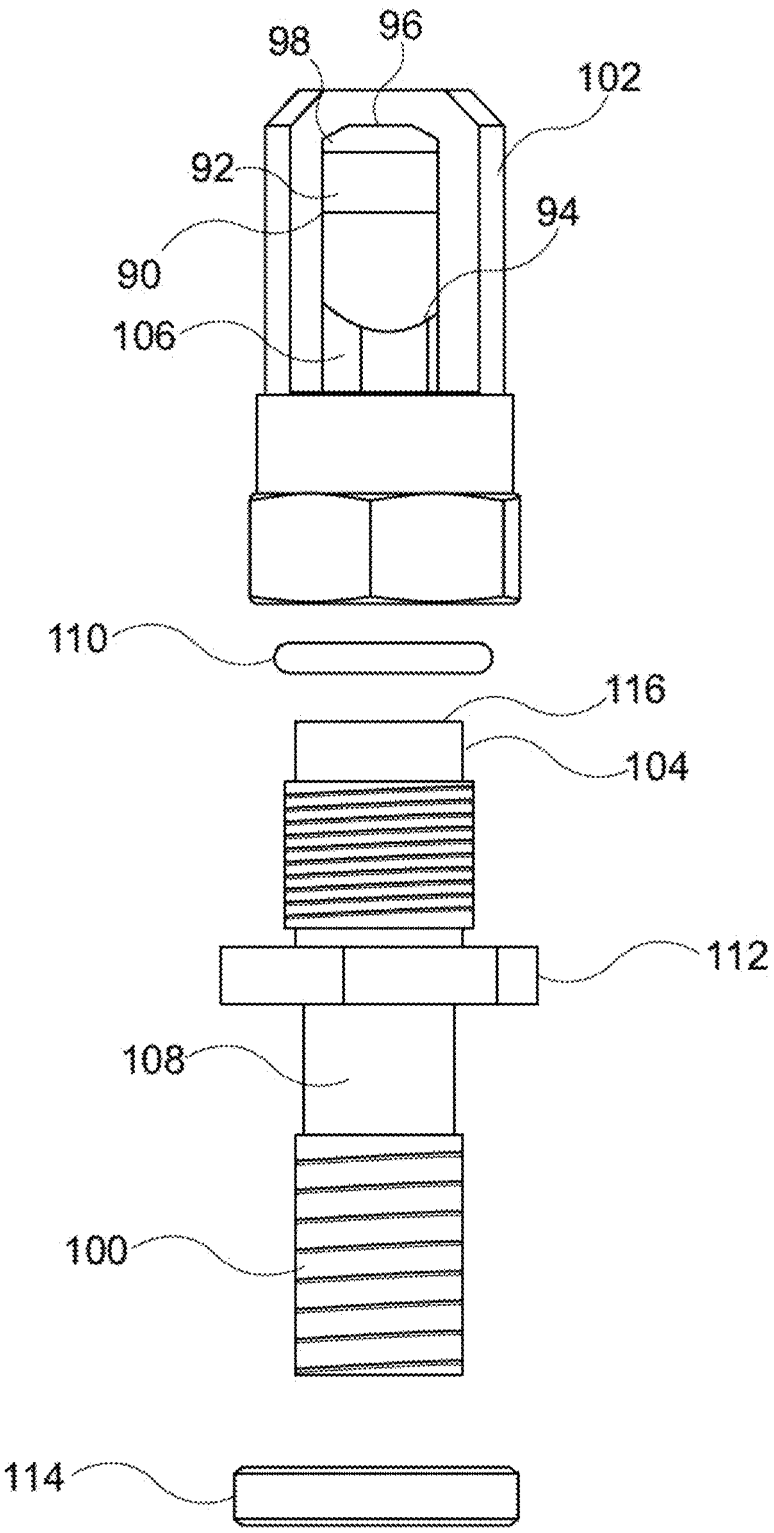
FIG. 10 illustrates an exemplary ball cage incorporating a flat bottom pill device in accordance with an embodiment of the present disclosure.

FIG. 10 shows a vent tube 100 comprising a ball cage 102 at the lower end 104 of the vent tube 100. However, the device located inside the ball cage 102 is a modified pill device 90, such as the flat bottom pill device, that is oblong in shape with an oval or spherical end 94, and a flat bottom end 96. The flat bottom pill device 90 is also captured in the ball cage 102, and as described above, is usually made up of a thermoplastic such as polypropylene, although other materials can be used. The flat bottom pill device 90 is free to move up and down the ball cage 102 along the z-axis, and can rotate in one axis inside the ball cage opening 106, but cannot rotate in other axes as the spherical ball 70 can rotate.

The vent tube 100 further comprises a vent tube body 108, a steam resistant O-ring 110, a hex adaptor 112 and a threaded washer 114. Other parts can be incorporated into the vent tube 100 as necessary, and the ball cage 102 can be designed longer than a standard ball cage to provide enough room to allow the flat bottom pill device 90 (or the other devices described herein) to move properly in the ball cage 102. Additionally, the lower portion of the ball cage 102, where the bottom 96 of the flat bottom pill device 90 rests against it, can be designed or configured to more closely adapt to the beveled edge 98 of the flat bottom pill device 90. In use, the ball cage is threaded onto the vent tube body 108 after the O-ring 110 has been properly located. The threaded washer is likewise threaded onto the end opposite the ball cage 102 to the proper location. Now the vent tube 100 with the flat bottom pill device 90 can be attached to the filling machine.

When in use, the spherical end 94 of the flat bottom pill device 90 is designed with a diameter larger than the vent tube opening 116, such that when the flat bottom pill device 90 moves up the z-axis to the top of the ball cage 102, the pill device 90 will block the vent tube opening thereby preventing gases from leaking into the vent tube 100.

It will be understood that the embodiments of the present disclosure, which have been described, are illustrative of some of the applications of the principles of the present disclosure. Although numerous embodiments of this disclosure have been described above with a certain degree of particularity, those skilled in the art could alter the disclosed embodiments without departing from the spirit or scope of this disclosure.

All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the disclosed system and methods.

Additionally, joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the disclosed apparatus, system and methods as disclosed herein.

The invention claimed is:

1. A vent tube and ball cage apparatus for use in filling a container during a filling process in which the ball cage is attached to the vent tube, and the vent tube is attached to a filling machine, comprising:

a vent tube body, said vent tube body being hollow and comprising a vent tube opening, said vent tube body configured to be attached to a filling machine and configured to vent a gas from the container during the filling process;

a ball cage, said ball cage comprising an opening, said ball cage attached to said vent tube body at said vent tube opening;

a pill device, said pill device having an oblong shape and having a bottom portion that is spherical, said pill device configured to be located inside said ball cage opening, said pill device, made up of polypropylene that will reduce in size when it makes contact with the inside of the ball cage and will fall out of said ball cage and said filling machine when it is sufficiently reduced in size, said pill device further comprising a top portion, and a cylinder portion, said cylinder portion providing said oblong shape of said pill device; and an indicator, said indicator being housed in said pill device, such that if said pill device falls out of said filling machine, said pill device can be detected from outside of said filling machine using an indicator detection system.

2. The vent tube and ball cage apparatus in claim 1, wherein said top portion comprises a beveled edge.

3. The vent tube and ball cage apparatus in claim 1, wherein said top portion comprises a flat bottom.

4. The vent tube and ball cage apparatus in claim 1, wherein said top portion comprises a spherical end.

5. The vent tube and ball cage apparatus in claim 1, wherein said indicator is a Radio Frequency Identification tag.

6. The vent tube and ball cage apparatus in claim 1, wherein said indicator detection system is a Radio Frequency Identification reader.

7. The vent tube and ball cage apparatus in claim 1, wherein said indicator is enclosed in said pill device during an injection molded process.

8. The vent tube and ball cage apparatus in claim 1, wherein said indicator is enclosed in said pill device during a machining process.

9. The vent tube and ball cage apparatus in claim 1, wherein said pill device is prevented from rotating in more than one axis due to said oblong shape.

10. The vent tube and ball cage apparatus in claim 1, wherein said indicator is a magnet.

11. A pill device for use with a vent tube and ball cage apparatus for filling a container in a filling machine in which the vent tube is configured to vent a gas from the container during a filling process, comprising:

a top portion, a cylinder portion and a bottom portion, said pill device configured such that said cylinder portion creates an oblong shape;

said pill device configured to be located in a ball cage opening in said ball cage, such that said ball cage prevents said pill device from rotating in more than one axis due to said oblong shape, said pill device, made up of polypropylene that will reduce in size when it makes contact with the inside of the ball cage and will fall out of said ball cage opening when it is sufficiently reduced in size;

said bottom portion configured in a spherical shape;

an indicator, said indicator being housed in said pill device, such that if said pill device falls out from said ball cage opening, said removal from said ball cage opening can be detected from outside of said filling machine using an indicator detector.

12. The pill device in claim 11, wherein said top portion comprises a beveled edge.

13. The pill device in claim 11, wherein said top portion comprises a flat bottom.

14. The pill device in claim 11, wherein said top portion comprises a spherical end.

15. The pill device in claim 11, wherein said indicator is a Radio Frequency Identification tag.

16. The pill device in claim 11, wherein said indicator detector is a Radio Frequency Identification reader.

17. The pill device in claim 11, wherein said indicator is enclosed in said pill device during an injection molded process.

18. The pill device in claim 11, wherein said indicator is enclosed in said pill device during a machining process.

19. The pill device in claim 11, wherein said indicator is a magnet.

* * * * *